United States Patent
Kohiyama et al.

(10) Patent No.: US 7,471,806 B2
(45) Date of Patent: Dec. 30, 2008

(54) METHOD, APPARATUS AND COMPUTER PROGRAM FOR INSERTING A WATERMARKING PROGRAM INTO AN IMAGE PROCESSING PROGRAM

(75) Inventors: Kiyoshi Kohiyama, Kawasaki (JP); Hiroshi Komazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 616 days.

(21) Appl. No.: 10/765,902

(22) Filed: Jan. 29, 2004

(65) Prior Publication Data

US 2004/0184612 A1  Sep. 23, 2004

(30) Foreign Application Priority Data

Mar. 10, 2003 (JP) ............... 2003-063705

(51) Int. Cl.
 *G06K 9/00* (2006.01)
(52) U.S. Cl. .............. 382/100; 382/100; 382/232; 382/240; 380/51; 380/54; 380/201; 380/287; 713/179; 375/240.21
(58) Field of Classification Search ............... 717/120; 380/217, 51, 54, 201, 210, 252, 287; 382/100, 382/232, 240; 713/176, 179; 283/72, 74–81, 283/85, 93, 113, 901, 902
See application file for complete search history.

(56) References Cited

U.S. PATENT DOCUMENTS

| | | | | |
|---|---|---|---|---|
| 5,613,004 A | * | 3/1997 | Cooperman et al. | 380/28 |
| 6,104,826 A | * | 8/2000 | Nakagawa et al. | 382/100 |
| 6,236,727 B1 | * | 5/2001 | Ciacelli et al. | 380/212 |
| 6,512,836 B1 | * | 1/2003 | Xie et al. | 382/100 |
| 6,801,999 B1 | * | 10/2004 | Venkatesan et al. | 713/167 |
| 6,898,706 B1 | * | 5/2005 | Venkatesan et al. | 713/167 |
| 6,954,350 B2 | * | 10/2005 | Honda et al. | 361/321.4 |
| 6,957,350 B1 | * | 10/2005 | Demos | 380/203 |
| 7,031,942 B2 | * | 4/2006 | Ogino et al. | 705/51 |
| 7,072,487 B2 | * | 7/2006 | Reed et al. | 382/100 |
| 7,072,492 B2 | * | 7/2006 | Ogawa et al. | 382/100 |
| 7,113,613 B2 | * | 9/2006 | Echizen et al. | 382/100 |
| 7,146,501 B2 | * | 12/2006 | Tanaka | 713/176 |
| 7,302,577 B2 | * | 11/2007 | Pelly et al. | 713/176 |
| 2008/0028474 A1 | * | 1/2008 | Horne et al. | 726/27 |

FOREIGN PATENT DOCUMENTS

| JP | 10-234012 | 9/1998 |
|---|---|---|
| JP | 2002-320085 | 10/2002 |

* cited by examiner

*Primary Examiner*—Jingge Wu
*Assistant Examiner*—Nancy Bitar
(74) *Attorney, Agent, or Firm*—Staas & Halsey LLP (57) ABSTRACT

At every reproduction of a moving image, a tamper resistant module (TRM) randomly selects any one of plural electronic watermark inserting modules, and incorporates the module selected into an area randomly selected from among plural non-operation (NOP) areas in an MPEG expansion module. The module can be switched for each image in a series of the moving images. Since an algorithm for inserting the electronic watermark differs for each moving image or each image, elimination of the electronic watermark by means of analysis, particularly, complete elimination from all the images, is extremely difficult.

19 Claims, 8 Drawing Sheets

METHOD, APPARATUS AND COMPUTER PROGRAM FOR INSERTING A WATERMARKING PROGRAM INTO AN IMAGE PROCESSING PROGRAM

CROSS-REFERENCE TO RELATED APPLICATIONS

This application is based upon and claims the benefit of priority from the prior Japanese Patent Application No.2003-063705, filed on Mar. 10, 2003, the entire contents of which are incorporated herein by reference.

BACKGROUND OF THE INVENTION

1) Field of the Invention

The present invention relates to a technology to create an image processing program for decrypting and expanding moving image data to output a moving image to a display.

2) Description of the Related Art

In recent years, due to development of information digitalizing techniques and spread of the Internet (particularly, high-speed broadband Internet), various kinds of copyrighted works protected by copyright law are digitalized and widely distributed via recording medium, such as a compact disk-read only memory (CD-ROM) or a digital versatile disk (DVD), and transmission medium such as the Internet, cable television (CATV), or satellite broadcasting.

One of the unavoidable problems with the digitalized information is illegal copying of the information without getting permission from the copyright holders. Since the digitalized information is not deteriorated by copying, when the illegal copying is carried out beyond a legal scope (for example, file exchange on the Internet), the copyrights and the right of use of the information are considerably infringed.

While this problem is quite noticeable in music industry, which causes a decrease in sales of music CDs, illegal copying of moving images (movies) is also predicted to escalate hereafter.

Figure 1:
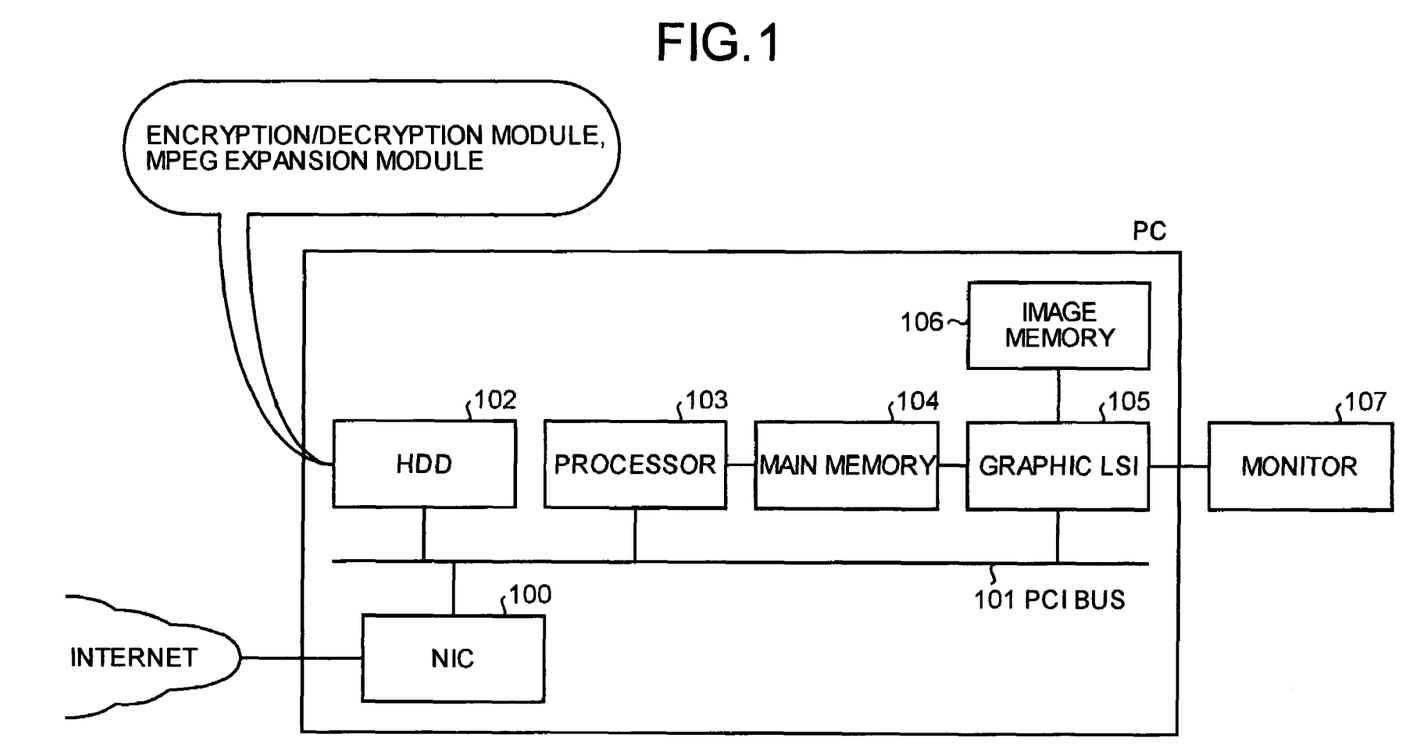
FIG. 1 is a block diagram of a conventional image processing apparatus.

FIG. 1 is a block diagram of a conventional image processing apparatus. Moving images distributed via, for example, the Internet are encrypted by predetermined encryption keys to prevent unauthorized people from snooping the moving images while transmission, and compressed by a predetermined method such as motion pictures expert group (MPEG) format to reduce a data size. A program to decrypt and expand the moving image data (hereinafter, "image processing program") is pre-installed in the image processing apparatus.

The moving images transmitted from network interface card (NIC) 100 via a peripheral component interconnect (PCI) bus 101 are temporarily stored in a hard disc drive (HDD) 102, and are read by a processor 103 into a main memory 104 according to an operation by a user such as pressing a "play button".

A processor 103 that executes the image processing program also read into the main memory 104 decrypts and expands the moving image data, and a graphic large scale integration (LSI) 105 transmits the decrypted and expanded moving images to an image memory 106. The transmitted moving images are converted into a format that can be displayed on a monitor 107 by the graphic LSI 105 (for example, converted from an YPbPr format into a digital red green blue (RGB) signal).

In the image processing apparatus, however, since an encryption/decryption key for moving images is incorporated into the image processing program in advance, the key can be extracted by analysis. Furthermore, the decrypted and expanded moving images can be read directly from the main memory 104 and the image memory 106. In an apparatus that adopts an open architecture, such as a personal computer, since an internal structure is well known, the above act can be easily conducted, compared with conventional audio and visual (AV) equipment.

On the other hand, all data in the image memory 106 including the moving images can be read from the processor 103. For this reason, the data in the image memory 106 (decrypted and expanded moving images) can be read in real time, copied, and distributed via the Internet without authorization during playback of the moving images.

A technique called "electronic watermark" leaves a proof that certain data are illegally copied in an ex-post manner in such illegal copies (for example, see Japanese Patent Application Laid-Open No. H10-234012).

An amount of information in moving images is considerably larger than that in still images, and a lot of information should be processed in a short time. In a system like national television system committee (NTSC), one image should be processed for every 1/30 second. That is to say, it should not take more than 1/30 second to put electronic watermarks into an individual image.

Some techniques to embed electronic watermarks into moving images under this limitation are suggested, roughly divided into two types including "visible watermark" and "invisible watermark".

(1) Visible Watermark

This method continuously displays a certain logo on a part of a screen. NHK-BS and some communication satellite (CS) broadcasting adopt this method. A process for putting watermarks is easy and requires a short time, and the presence of watermarks is obvious for viewers.

(2) Invisible Watermark

This watermark is not accurately "invisible", but is hard to be recognized by human eye. An original image is divided into frequency components by one-dimensional or two-dimensional Fourier transform, and data related to a copyright holder are inserted into one or plural specified high-frequency component(s).

In the visible watermarking method, however, a redundant component is continuously displayed on an original image, and this may cause discomfort to viewers. Some watermarks can be occasionally eliminated by less difficult means. For example, when a movie is broadcasted, a wide screen image is put on a television screen of 4:3, and thus black zones are formed on the top and the bottom of the main screen. A watermark displayed on such black zones can be easily eliminated.

In the invisible watermarking method, when algorithm for inserting an electronic watermark is once specified, the watermark can be eliminated easily by deleting whole frequency components corresponding to watermark inserting destination. In this case, since information on a portion of "hard to see" is deleted, image quality is not greatly deteriorated even when the watermark is eliminated.

For this reason, the invisible watermarking method is mainly applied to fields which are influenced easily by deterioration of an image. If image quality of a painting in art museum is deteriorated even a little, for example, the virtue of the painting is reduced greatly. For this reason, when such a painting is opened to the public via the Internet, the insertion of a watermark is effective. Meanwhile, unlike the painting, a moving image does not originally have very high image quality, and it is hardly considered that its value drops enormously due to the deterioration caused by eliminating the watermark.

Since the conventional electronic watermark can be eliminated comparatively with ease, image deterioration due to the elimination is small, and a source of an illegal copied product cannot be accurately specified from the watermark, even when the electronic watermark is embedded, the effect of protection from illegal copying can hardly be expected.

SUMMARY OF THE INVENTION

It is an object of the present invention to solve at least the problems in the conventional technology.

The apparatus for creating image processing program, according to one aspect of the present invention includes a program selecting unit that selects at least one watermarking program from among a plurality of watermarking programs for inserting electronic watermark data into moving image data that are encrypted, compressed, or both encrypted and compressed, an area selecting unit that selects at least one area from among a plurality of areas in a processing program that performs decrypting, expanding, or both decrypting and expanding the moving image data, and a program inserting unit that inserts the watermarking program selected into the area selected.

The method of creating image processing program, according to another aspect of the present invention includes selecting at least one watermarking program from among a plurality of watermarking programs for inserting electronic watermark data into moving image data that are encrypted, compressed, or both encrypted and compressed, selecting at least one area from among a plurality of areas in a processing program that performs decrypting, expanding, or both decrypting and expanding the moving image data, and inserting the watermarking program selected into the area selected.

The computer program for creating image processing program, according to still another aspect of the present invention realizes the method according to the present invention on a computer.

The other objects, features, and advantages of the present invention are specifically set forth in or will become apparent from the following detailed descriptions of the invention when read in conjunction with the accompanying drawings.

DETAILED DESCRIPTION

Exemplary embodiments of a method of, an apparatus for, and a computer program for creating the image processing program, according to the present invention are explained in detail below with reference to the accompanying drawings.

Even if a product is copied without eliminating the watermark, only information (copyright holder) about the copyright and fact that the product is illegally copied is normally revealed from the watermark, while a person who illegally copied the product is not specified. In general, it is very difficult to specify a distribution source of information circulating on the Internet. When the copy is distributed repeatedly, it is not easy to specify a person and a personal computer who/which copied and distributed information without authorization.

In order to enable a copy source and a distribution source to be specified, it is ideal that specific information (for example, a serial number) of the personal computer is inserted into an electronic watermark at the time of copying with software in the personal computer. However, since the software can be easily analyzed, altered, and snooped, the algorithm is possibly decrypted and the above function can easily made to be invalid.

Figure 2:
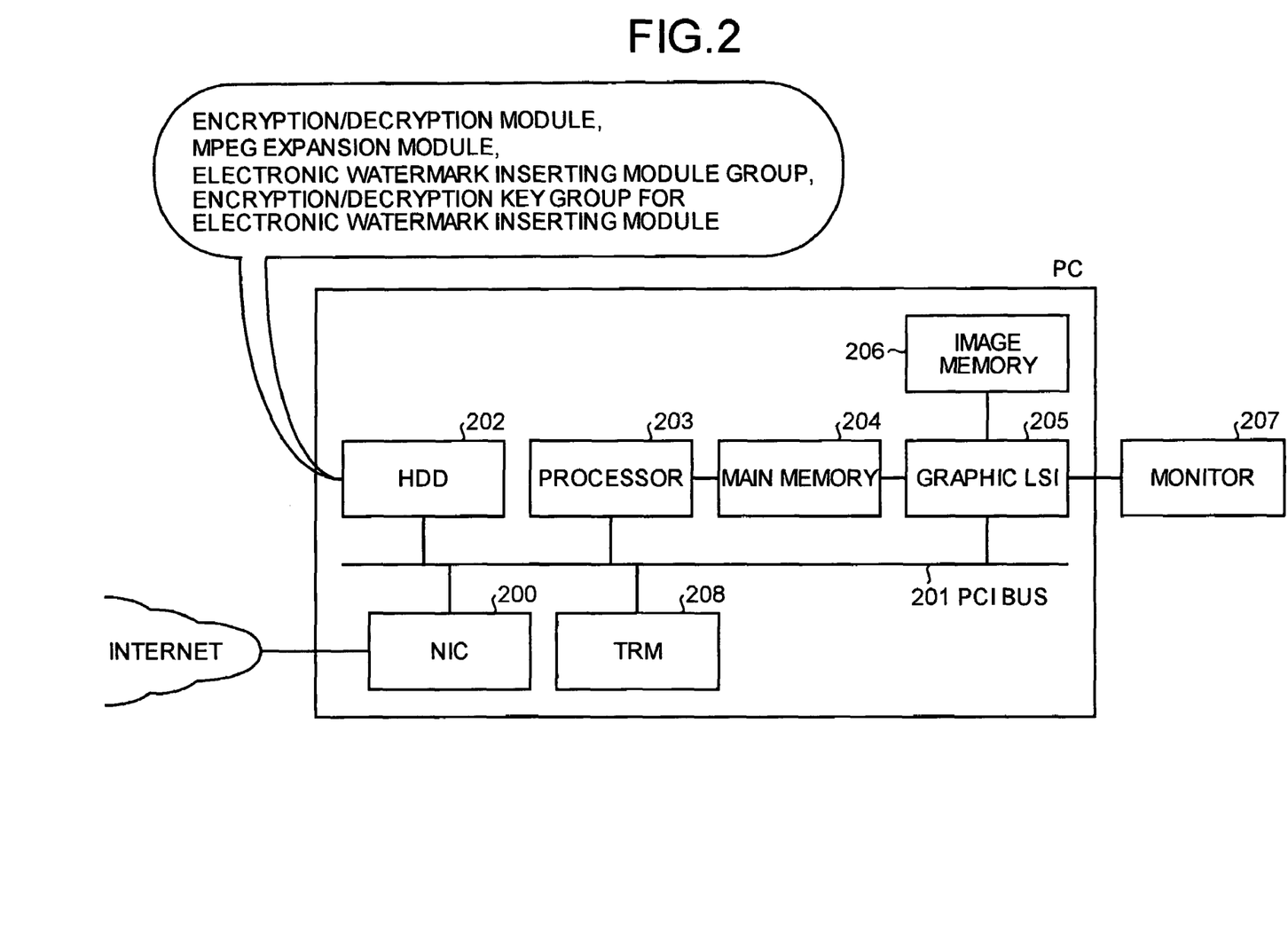
FIG. 2 is a block diagram of an image processing apparatus according to a first embodiment of the present invention.

FIG. 2 is a block diagram of an image processing apparatus according to a first embodiment of the present invention. A moving image, which is sent from an NIC 200 via a PCI bus 201 and once stored in an HDD 202, is read into a main memory 204 by a processor 203 according to an operation by a user such as pressing a "play button".

The processor 203 that executes the program read into the main memory 204 decrypts and expands the moving image, and a graphic LSI 205 transmits the decrypted and expanded moving image to an image memory 206. The transmitted moving image is converted into a format that can be displayed on a monitor 207 by the graphic LSI 205 (for example, converted from an YPbPr format into a digital RGB signal), to be displayed on the monitor 207.

When this constitution is compared with the constitution of the conventional apparatus shown in FIG. 1, a tamper resistant module (TRM) 208 is added to a hardware configuration. The TRM 208 is a hard ware designed to break an inside when internal data are tried to be snooped, altered and analyzed from the outside. The TRM 208 is embedded into a PC card, for example, to be connected with a personal computer via a PC card slot. The TRM 208 corresponds to the image processing program creating apparatus in the present invention.

Further, a group including n types of electronic watermark inserting modules, and a group including encryption/decryption keys for individual modules are added as software. In this apparatus, an encryption/decryption module, an MPEG expansion module, an electronic watermark inserting module (and its encryption/decryption key group) constituting the image processing program are encrypted and dispersed in the HDD 202.

Figure 3:
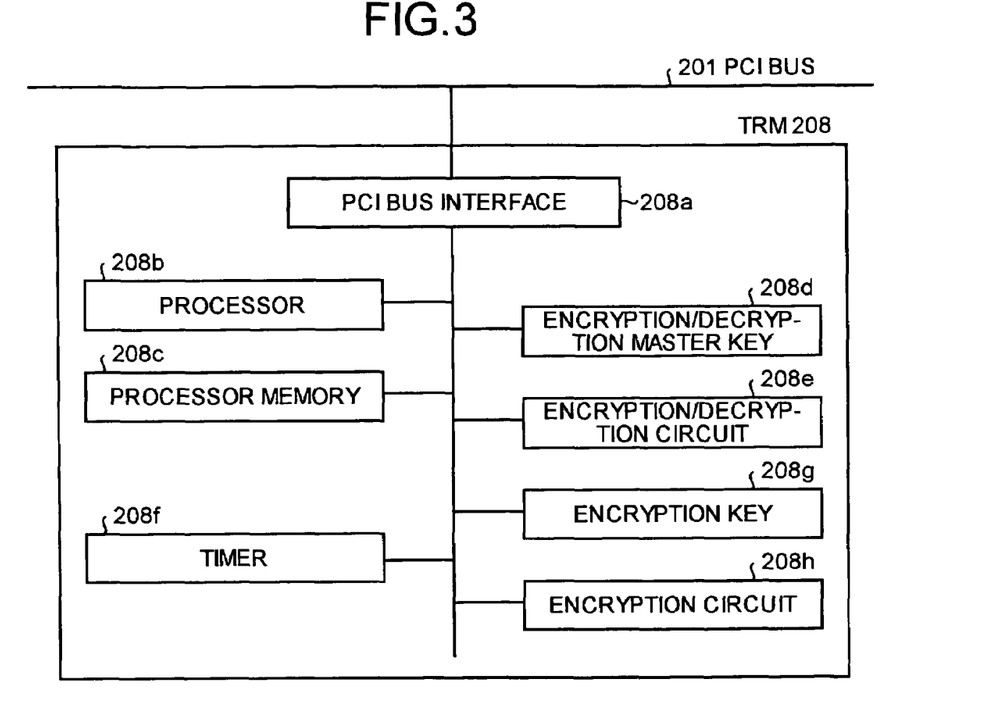
FIG. 3 is a block diagram of an apparatus for creating an image processing program (TRM) 208), according to the first embodiment.

FIG. 3 is a block diagram of an apparatus for creating an image processing program (TRM) 208), according to the first embodiment. A PCI bus interface 208a controls transmission/reception of data with the PCI bus 201. A processor 208b controls an entire operation of the TRM 208. A processor memory 208c provides a program and a work area for the processor 208b.

An encryption/decryption master key 208d is for decrypting the encryption/decryption key for a moving image, and for decrypting the encryption/decryption keys for the encryption/decryption module, the MPEG expansion module, and the electronic watermark inserting module. An encryption/decryption circuit 208e decrypts input data using the encryption/decryption master key 208d. A timer 208f measures a current date and time. An encryption key 208g is for creating a digital signature, mentioned later. An encryption circuit 208h (hash circuit) encrypts input data using the encryption key 208g.

Figure 4:
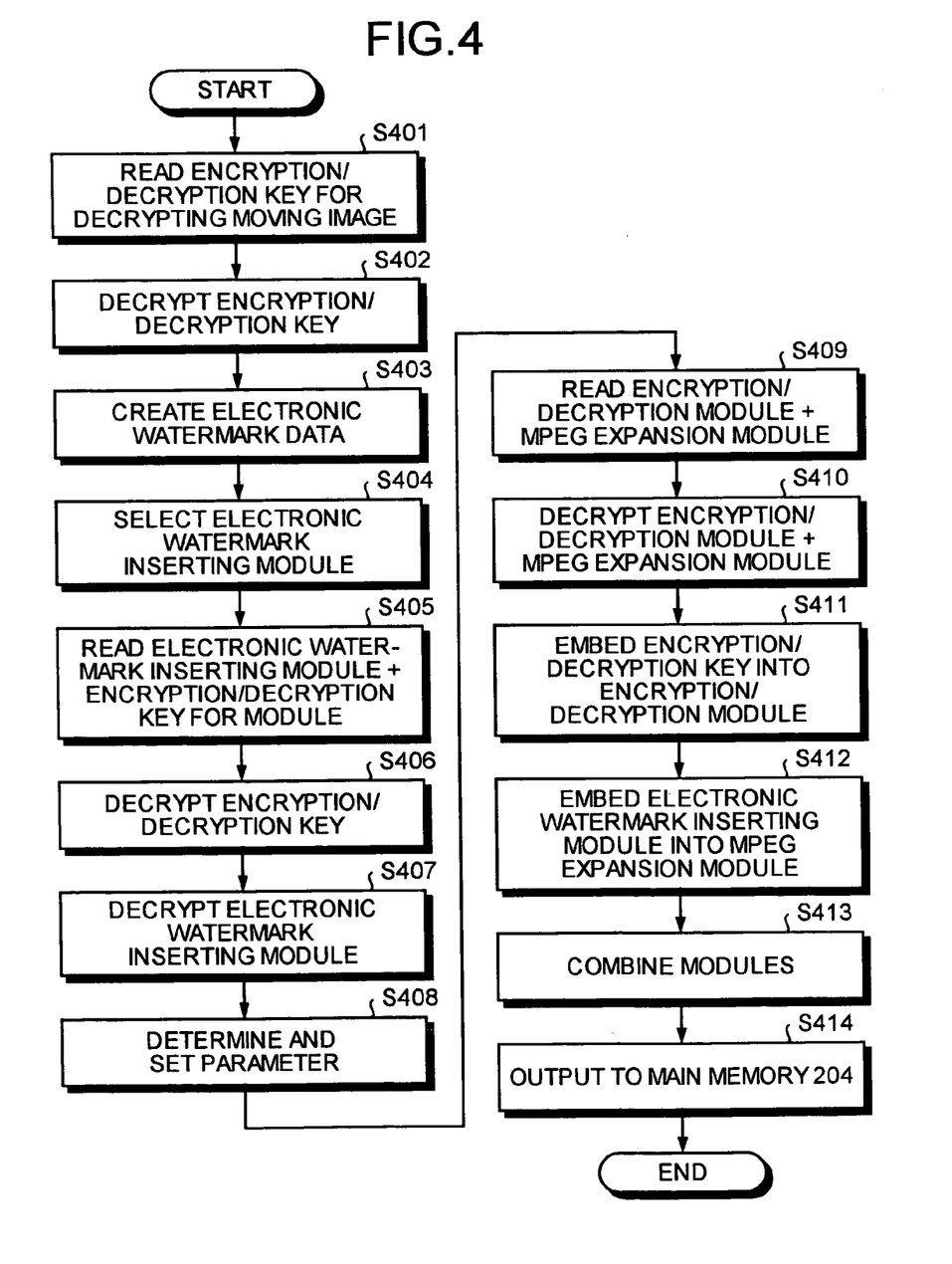
FIG. 4 is a flowchart of a procedure of the apparatus for creating the image processing program, according to the first embodiment.

FIG. 4 is a flowchart of a procedure of the apparatus for creating the image processing program, according to the first embodiment.

Prior to starting of the process shown in the drawing, it is assumed that a moving image and an encryption/decryption key for decrypting the moving image (distributed together with the moving image) are saved in the HDD 202. When a user specifies the moving image and instructs viewing, the instruction is transmitted to the TRM 208 via the PCI bus 201 and the PCI bus interface 208a. The processor 208b of the TRM 208 executes the following process according to the program retained by the processor memory 208c (program for creating the image processing program).

The processor 208b reads the encryption/decryption key for decrypting the moving image from the HDD 202 via the PCI bus 201 and the PCI bus interface 208a into the processor memory 208c (step S401). The key and the encryption/decryption master key 208d for decrypting the key are supplied to the encryption/decryption circuit 208e, so that the encryption/decryption key read at step S401 is decrypted (step S402).

The processor 208b creates data which are embedded as an electronic watermark into the moving image (step S403). The data concretely include:

(1) a TRM number (plaintext) which is a specific number allocated to the TRM 208;

(2) current date and time (plaintext); and (3) the TRM number+the current date and time encrypted by the encryption key 208g of the TRM 208.

The data (3) cannot be created without the encryption key 208g (it is proven mathematically that the specification of the encryption key 208g by analysis of the encrypted data is very difficult). That is to say, it can be ensured that a creating source is the TRM 208 having this key. In other words, in the present invention, a digital signature of the TRM 208 is inserted as the electronic watermark when the moving image is viewed. When a watermark such as the copyright information is already inserted into the moving image, the watermark is further inserted by the present invention.

The processor 208b supplies the TRM number read from the processor memory 208c, the current date and time read from the timer 208f, and the encryption key 208g necessary for hash to the encryption circuit 208h. The processor 208b combines the TRM number and the current date and time before the encryption with the encrypted TRM number and the encrypted current date and time so as to create watermark data (step S403). Information other than the TRM number and the current date and time may be suitably added to the watermark data.

The processor 208b randomly selects any one of the n-types of the electronic watermark inserting modules saved in the HDD 202 (step S404). The processor 208b reads the selected module and the encryption/decryption key for the module from the HDD 202 via the PCI bus 201 and the PCI bus interface 208a into the processor memory 208c (step S405).

The individual electronic watermark inserting modules are encrypted by the corresponding encryption/decryption keys, respectively, and the encryption/decryption keys are encrypted. The processor 208b decrypts the encryption/decryption master key 208d and the encryption/decryption key read by the encryption/decryption circuit 208e (step S406), and decrypts the electronic watermark inserting module read by the decrypted encryption/decryption key (step S407).

The processor 208b randomly determines a parameter required by the decrypted module, and sets the parameter and the watermark data created at step S403 in the module (step S408).

When the selected module inserts the "visible watermark", the parameter includes a position (place) where the watermark is inserted, a size of the watermark, and the like. When the module inserts the "invisible watermark", the parameter includes a frequency band with which the watermark is inserted, and the like. The parameter which is common to both the cases includes an inserting interval, namely, images in the continuous moving image where the watermark is inserted (each image, every tenth image, every random number-th image).

The processor 208b reads the encryption/decryption module and the MPEG expansion module saved in the HDD 202 into the processor memory 208c via the PCI bus 201 and PCI bus interface 208a (step S409). Since these modules are encrypted, the processor 208b decrypts the modules using the encryption/decryption master key 208d and the encryption/decryption circuit 208e (step S410).

The processor 208b embeds the encryption/decryption key for decrypting the moving image which is decrypted at step S402 into the encryption/decryption module decrypted at step S410 (step S411).

Non-operation (NOP) areas (free areas where instructions and data are not present) are provided to predetermined positions in the decrypted MPEG expansion module. The processor 208b randomly selects any one of the plural NOP areas, and embeds the electronic watermark inserting module where the parameter is set into the selected NOP area (step S412).

The processor 208b combines the encryption/decryption module into which the encryption/decryption key is embedded with the MPEG expansion module into which the electronic watermark inserting module is embedded, so as to complete the image processing program (step S413). The completed program is output to the main memory 204 via the PCI bus interface 208a and the PCI bus 201 (step S414).

Figure 5:
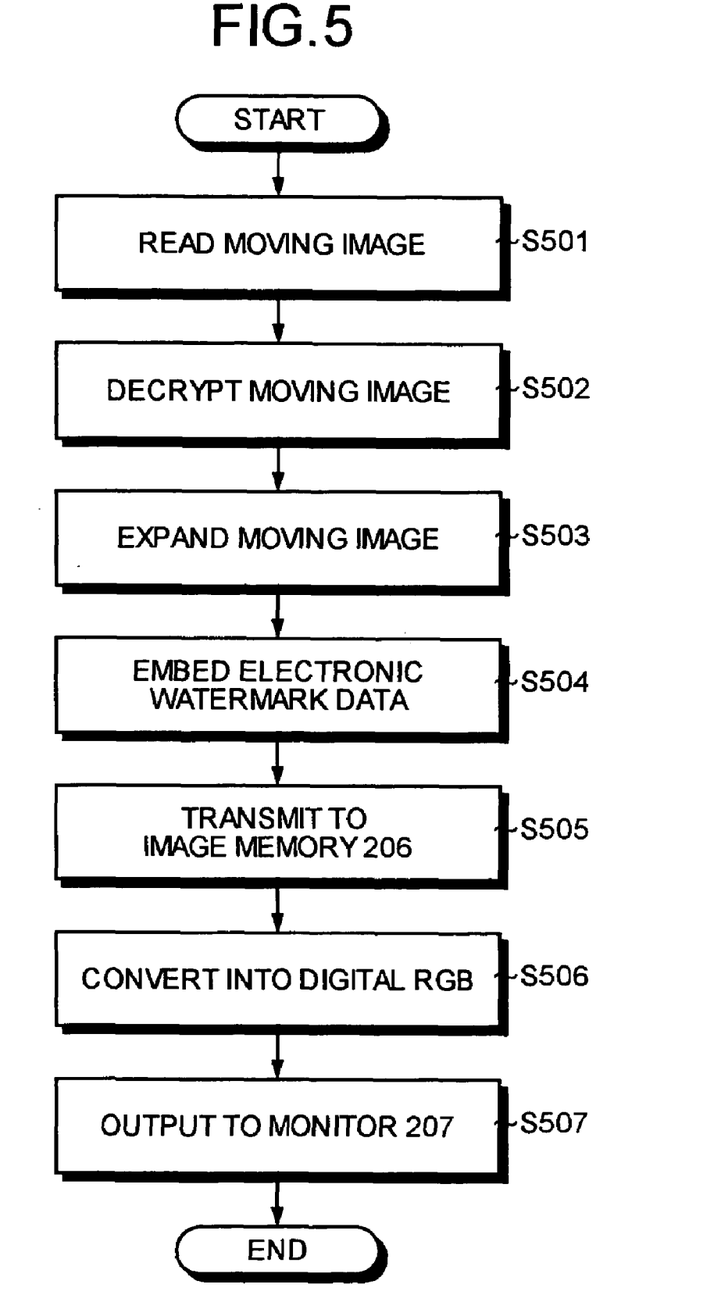
FIG. 5 is a flowchart of a procedure of playback of a moving image in the image processing apparatus according to the first embodiment.

The control, thereafter, is transferred to the processor 203. The processor 203 executes the program loaded into the main memory 204 so as to output the moving image instructed to be viewed to the monitor 207. FIG. 5 is a flowchart of a procedure of playback of a moving image in the image processing apparatus according to the first embodiment.

The processor 203 reads the moving image in the HDD 202 into the main memory 204 (step S501), and encrypts the moving image using the encryption/decryption module (step S502). The encryption/decryption key necessary for decryption (this is encrypted and distributed together with the moving image) is already decrypted by the encryption/decryption master key 208d and incorporated into the module as explained above. The decrypted moving image, namely, the compressed MPEG moving image is once stored in the main memory 204.

The processor 203 reads the compressed MPEG moving image from the main memory 204, and expands it using the MPEG expansion module (step S503). The expanded moving image generally has the YPbPr format.

The electronic watermark inserting module which is incorporated into the NOP area of the MPEG expansion module embeds the watermark data including the TRM number and the like into the YPbPr image (step S504). The inserting position, the frequency band, and the like of the watermark data comply with the parameter set in the module. When the watermark is set to be inserted into not all the images but intermittently into every certain number-th image, the watermark is inserted into only the images which meet the condition.

The YPbPr image into which the electronic watermark is inserted is once saved in the main memory 204 again, and the graphic LSI 205 transfers the image to the image memory 206 (step S505). The YPbPr image is converted into a digital RGB signal, for example (step S506) so as to be output to and displayed on the monitor 207 (step S507).

According to the first embodiment, the specific number of the TRM 208 and the reproduction date and time, namely, a date, a person, and a personal computer that relates to the reproduction of contents are embedded as the electronic watermark into the YPbPr image in the image memory 206, even if the YPbPr image is intercepted (hacked) and provided on the Internet. A legal right holder can prove that the right holder's literary work is illegally copied and can specify a source of the copied product certainly because the TRM number and the like as well as the copyright information originally embedded by a distribution source of the contents are inserted by a user's personal computer.

Not the processor 208b on the side of the TRM 208 but the processor 203 on side of the personal computer actually inserts the electronic watermark (the processor 208b only selects and decrypts the electronic watermark inserting module so as to output it to the main memory 204). For this reason, even if the performance of the processor 208b mounted to the TRM 208 is low, a watermark can be embedded by complicated and advanced algorithm.

In the first embodiment, since the electronic watermark inserting module incorporated into the MPEG expansion module differs "every time" (this means every time of the reproduction), even if a watermark can be eliminated from a certain image product A, in order to eliminate a watermark of another image product B, the watermark should be analyzed additionally. Furthermore, since the position (the inserting position in the MPEG expansion module) of the program in the module changes every time, it is difficult to specify even a portion of the program where the watermark is embedded.

In the first embodiment, however, since the algorithm of the watermark in the product A is specified, watermarks of B, C, D, and so on, other than A can be avoided from being eliminated. The elimination of the watermark, and unauthorized copying and distribution after the elimination of the product A cannot be, however, inhibited. Like in the second embodiment, explained below, therefore, it may be such that a watermark can not be eliminated from one moving image (this can be realized in theory but cannot be realized for practical purposes).

The constitution of the image processing apparatus according to the second embodiment of the present invention is the same as that in the first embodiment shown in FIG. 2 (also the constitution of the TRM 208 is the same as that in the first embodiment shown in FIG. 3). A difference therebetween is that a program for rewriting the program output to the main memory 204 at step S414 as well as the program for executing the process shown in FIG. 4 is retained in the processor memory 208c of the TRM 208.

The processor 208b in the second embodiment selects a plurality of the electronic watermark inserting modules at step S404 of FIG. 4. The processor 208b determines and sets parameters for the respective selected modules at step S408 accordingly, and selects the NOP areas as the insertion destinations for the modules at step S412.

Figure 6:
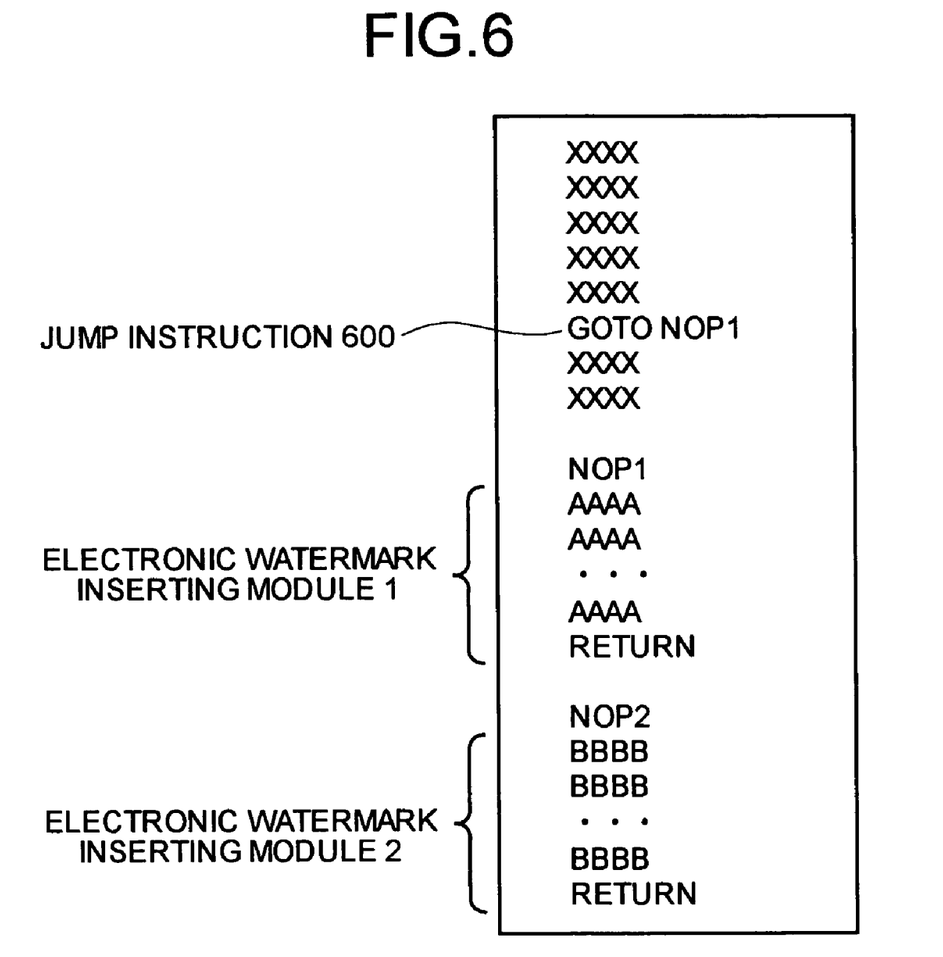
FIG. 6 is a schematic diagram of internal configuration of an image processing program created by an apparatus for creating the image processing program, according to a second embodiment of the present invention.

FIG. 6 is a schematic diagram of internal configuration of an image processing program created by an apparatus for creating the image processing program, according to a second embodiment of the present invention. Portions marked with "XXXX" in the drawing are codes of the encryption/decryption modules or the MPEG expansion modules. The portions marked with "AAAA" and "BBBB" are the individual electronic watermark inserting modules. Since the tails of the "AAAA" and "BBBB" represent a return instruction, the electronic watermark inserting modules are subroutines.

The image processing program shown in FIG. 6 which is created by the TRM 208 is loaded into a specified memory area of the main memory 204 so as to be executed by the processor 203. The processor 203 executes the program in the drawing one after another, and when it meets a jump instruction 600, it jumps to a specified jump destination, namely, an NOP 1 in the example of the drawing, so as to insert a watermark according to the procedure of the electronic watermark inserting module 1.

When the jump destination of the jump instruction 600 is rewritten from "NOP 1" into "NOP 2" during the execution of the program, the program embeds the watermark according to the procedure of the module 2. When the electronic watermark inserting module which is actually used is changed in real time, the watermarks can be inserted into the individual images composing a series of the moving images by different algorithms.

Figure 7:
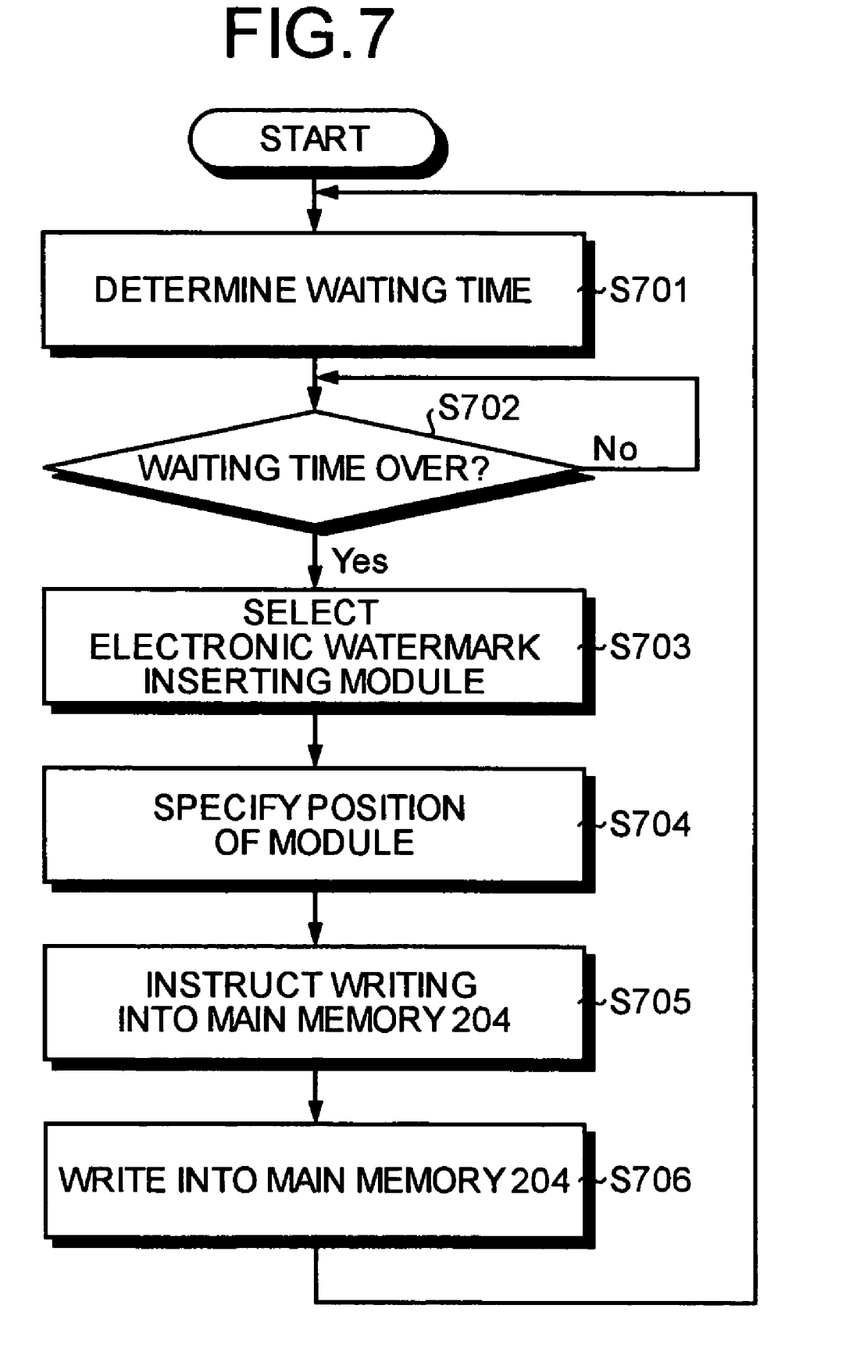
FIG. 7 is a flowchart of a procedure of switching an electronic watermark inserting module in the apparatus for creating the image processing program, according to the second embodiment.

FIG. 7 is a flowchart of a procedure of switching an electronic watermark inserting module in the apparatus for creating the image processing program, according to the second embodiment.

Prior to the starting of the process in the drawing, a comparative table, representing where electronic watermark inserting modules which are embedded into the NOP areas by the processor 208b at step S412 in FIG. 4 are related with the NOP areas in the MPEG expansion modules, is created and saved in the processor memory 208c of the TRM 208. While the image processing program is being executed by the processor 203, the process in the drawing is executed repeatedly by the processor 208b.

The processor 208b of the TRM 208 randomly determines a waiting time until the electronic watermark inserting module is switched according to random digits or the like (step S701). When the determined waiting time elapses (Yes at step S702), the processor 208b refers to the comparative table and randomly selects any one of the electronic watermark inserting modules (step S703). The processor 208b reads a position of the selected module, namely, an NOP area in the MPEG expansion module into which the selected module is incorporated (step S704).

An address of a writing destination (an address where the jump instruction 600 is stored) and a new jump destination of the jump instruction 600 (in this example, a starting address of "NOP 2") are attached to the instruction of writing into the main memory 204 so as to be transmitted from the PCI bus interface 208a to the PCI bus 201 (step S705). The processor 203 which receives them rewrites the jump instruction 600 in the main memory 204 according to the instruction (step S706).

A plurality of the electronic watermark inserting modules is pre-loaded into the main memory 204, and the jump destination of the jump instruction 600 is changed so that the module to be used actually is switched. On the contrary, the module in the jump destination is rewritten by the processor 208*b* (the module to be used actually is loaded into the main memory 204 every time), so that the watermark inserting algorithm can be changed. In the example of FIG. 6, while the jump destination of the jump instruction 600 is always set as the NOP 1, the code of the NOP 1 is switched from "AAAA" into "BBBB".

According to the second embodiment, since the watermark inserting algorithm differs for each image in one moving image, even if the elimination of a certain watermark is succeeded, it is virtually impossible to eliminate the watermarks from all the images composing the moving image.

For this reason, a hacker copies contents hacked from the image memory 204 in which the electronic watermark is embedded. When a providing source of the contents which is a service provider detects that a lot of illegal copies of its own contents are circulated through the Internet or the like, the providing source consigns analysis of the copied contents to a special electronic watermark analyzing agency in order to specify their source.

Unlike the conventional technology, the electronic watermark embedded by the present invention is randomly changed for each moving image or each image composing a series of the moving images. For this reason, it is more difficult to extract the electronic watermarks from the products in comparison with the conventional technology. When, however, a hacker tries to make the TRM number, namely, the source of the copied product unclear, the hacker should eliminate all watermarks in the moving image. On the contrary, when the analyzing agent tries to specify the source, the analyzing agent extracts a watermark from only one image in the moving image successfully.

Figure 8:
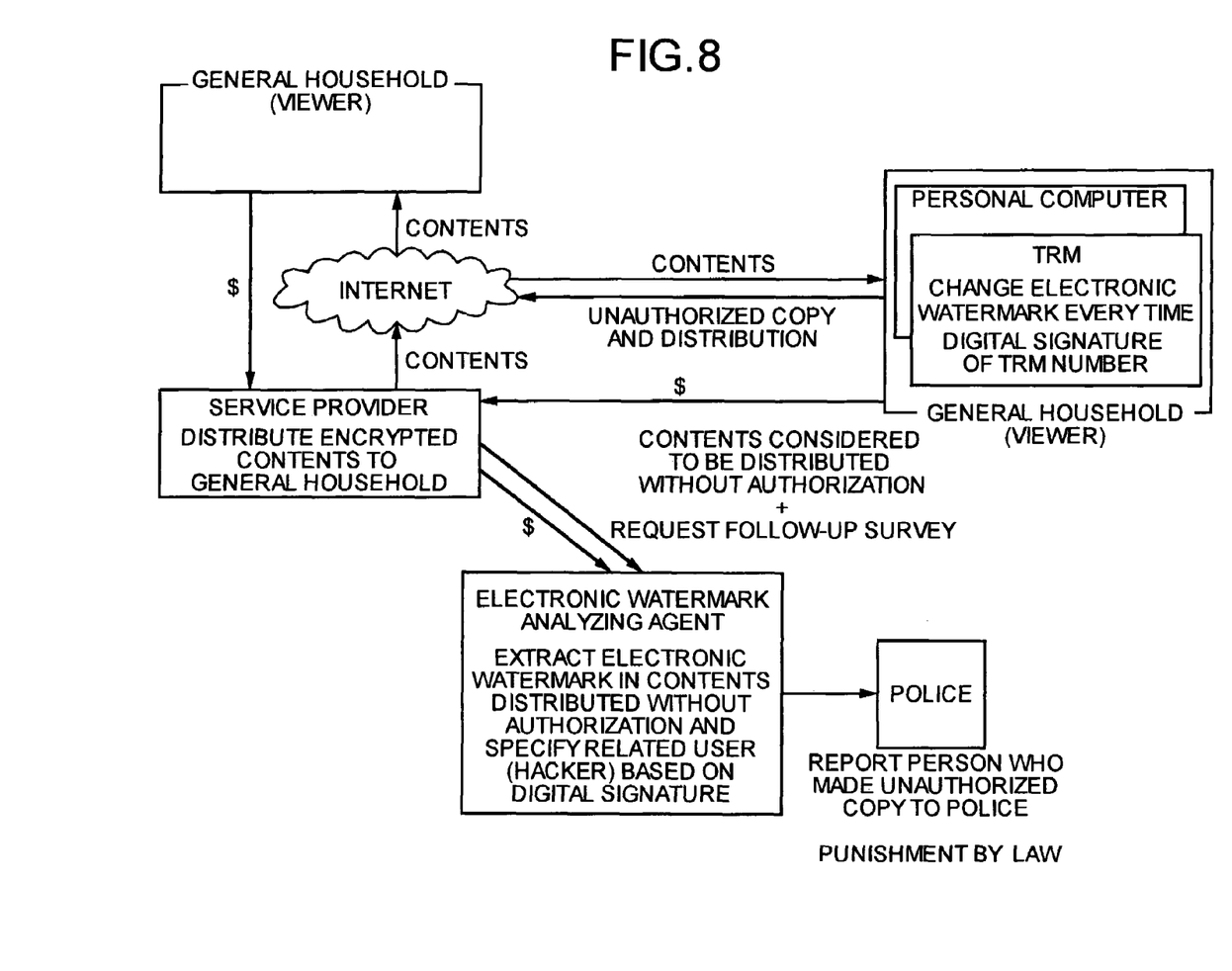
FIG. 8 is a schematic diagram for illustrating a patterned flow from sale of a product to specifying a source of an illegal copying of the product.

The electronic watermark includes the encrypted TRM number, and the encrypting cannot be performed without the encryption key 208*g* which is known by only certain people such as a service provider. For this reason, the electronic watermark becomes effective evidence that the watermark is inserted by the TRM 208 having the encryption key 208*g*. That is to say, since it is almost certain that a copy with the electronic watermark is hacked by a personal computer into which the TRM 208 is incorporated, the owner of the personal computer will be reported to police and will be legally punished (see FIG. 8).

The first and the second embodiments explain the insertion of the electronic watermark into the moving image as the example, but it is very effective from a viewpoint of inhibition of illegal copies that information which can specify a display/reproduction source is embedded as a watermark into a still image, sound, music, a text, and the like or embedding algorithm is changed every time.

The programs for executing the process shown in FIG. 4 and FIG. 7 are recorded in various types of recording media, such as a flexible disc, a ROM, a CD-ROM, a CD-rewritable (CD-RW), a magneto optical disk (MO), and a DVD as well as the TRM 208 which can be read by the processor. The programs can be distributed in the format of the recording media. Further, the programs can be distributed via a network such as Internet.

At the time of reproduction of a moving image (precisely, at the time of decrypting/expanding), the program created by the invention can randomly embed information which can specify a reproduction source into the moving image in a format such that elimination of the information is very difficult due to rulelessness. For this reason, a person who makes a copy without authorization can be specified from the information transferred to the copy quickly and certainly. This can realize the image processing program creating method, the program for creating the image processing program, and the image processing program creating apparatus that can inhibit unauthorized copy and unauthorized distribution of the decrypted/expanded moving image present in a memory or the like of a personal computer.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An apparatus that decrypts encrypted moving image data or expands compressed moving data by executing an image processing program, comprising:
a program selecting unit that selects at least one watermarking program from a plurality of watermarking programs for inserting electronic watermark data into the moving image data;
an area selecting unit that selects at least one area of a processing program for inserting the selected at least one watermarking program; and
a program inserting unit that generates the image processing program by inserting the selected at least one watermarking program into the selected at least one area of the processing program, wherein the electronic watermark data include a unique number of a tamper resistant module included in the apparatus, and the unique number is encrypted by a unique encryption key of the tamper resistant module.

2. The apparatus according to claim 1, wherein:
the program selecting unit selects the at least one watermarking program at random, and
the area selecting unit selects the at least one area of the processing program at random.

3. The apparatus according to claim 1, wherein the electronic watermark data include information unique to the apparatus.

4. The apparatus according to claim 1, further comprising:
a parameter determining unit that randomly determines a parameter necessary to operate the selected at least one watermarking program.

5. The apparatus according to claim 1, further comprising:
a program rewriting unit that rewrites a jump destination specified by a jump instruction in the image processing program from any one watermarking program inserted by the program inserting unit into another watermarking program.

6. The apparatus according to claim 5, wherein the program rewriting unit rewrites the jump destination during an execution of the image processing program.

7. A method of decrypting encrypted moving data or expanding compressed moving data by executing an image processing program, comprising:
selecting at least one watermarking program from a plurality of watermarking programs for inserting electronic watermark data into the moving image data;
selecting at least one area from a plurality of areas of a processing program for inserting the selected at least one watermarking program; and
generating the image processing program by inserting the selected at least one watermarking program into the selected at least one area of the processing program, wherein the electronic watermark data include a unique number of a tamper resistant module included in the apparatus, and the unique number is encrypted by a unique encryption key of the tamper resistant module.

8. The method according to claim 7, wherein
the selecting of the at least one watermarking program includes selecting the watermarking program at random, and
the selecting of the at least one area of the processing program includes selecting the at least one area at random.

9. The method according to claim 7, wherein the electronic watermark data include information unique to an apparatus on which the method is performed.

10. The method according to claim 7, further comprising:
determining randomly a parameter necessary to operate the selected at least one watermarking program.

11. The method according to claim 7, further comprising:
rewriting a jump destination specified by a jump instruction in the image processing program from any one watermarking program inserted an area of the processing program to another watermarking program inserted therein.

12. The method according to claim 11, wherein the rewriting is performed during an execution of the image processing program.

13. A computer readable medium storing a program for decrypting encrypted moving data or expanding compressed moving data by executing an image processing program, which program when executed on a computer controls the computer to execute:
selecting at least one watermarking program from a plurality of watermarking programs for inserting electronic watermark data into the moving image data;
selecting at least one area from a plurality of areas of a processing program for inserting the selected at least one watermarking program in the processing program; and
generating the image processing program by inserting the selected at least one watermarking program into the selected at least one area of the processing program,
wherein the electronic watermark data include a unique number of a tamper resistant module, and the unique number is encrypted by a unique encryption key of the tamper resistant module.

14. The computer readable medium according to claim 13, wherein:
the selecting of the at least one watermarking program includes selecting the watermarking program at random, and
the selecting of the at least one area of the processing program includes selecting the at least one area at random.

15. The computer readable medium according to claim 13, wherein the electronic watermark data include information unique to an image processing apparatus that executes the image processing program.

16. The computer readable medium according to claim 13, further controls the computer to execute:
determining randomly a parameter necessary to operate the selected at least one watermarking program.

17. The computer readable medium according to claim 13, further controls the computer to execute:
rewriting a jump destination specified by a jump instruction in the image processing program from any one watermarking programs inserted in the processing program to another watermarking program inserted therein.

18. The computer readable medium according to claim 17, wherein the rewriting is performed during an execution of the image processing program.

19. An apparatus generating an image processing program that performs watermarking together with decrypting, expanding, or both decrypting and expanding moving image data, comprising:
a program selecting unit that selects at least one watermarking program from a plurality of watermarking programs;
an area selecting unit that selects at least one location in a processing program that performs decrypting, expanding, or both decrypting and expanding moving image data, for respectively inserting the selected at least one watermarking program;
a program inserting unit that generates an image processing program by inserting each of the selected at least one watermarking program into a respective one of the selected at least one location of the processing program;
a parameter determining unit that randomly determines a parameter necessary to operate the selected at least one watermarking program; and
a program rewriting unit that rewrites a jump destination specified by a jump instruction in the image processing program from any one of the watermarking programs inserted by the program inserting unit into another watermarking program,
wherein the electronic watermark data include a unique number of a tamper resistant module included in the apparatus.

* * * * *

UNITED STATES PATENT AND TRADEMARK OFFICE
CERTIFICATE OF CORRECTION

PATENT NO. : 7,471,806 B2
APPLICATION NO. : 10/765902
DATED : December 30, 2008
INVENTOR(S) : Kiyoshi Kohiyama et al.

Page 1 of 1

It is certified that error appears in the above-identified patent and that said Letters Patent is hereby corrected as shown below:

Column 11, Line 17, after "inserted" insert --into--.

Signed and Sealed this

Twenty-fourth Day of March, 2009

JOHN DOLL
*Acting Director of the United States Patent and Trademark Office*